No. 680,489. Patented Aug. 13, 1901.
E. P. F. MAGNIEZ.
MACHINE FOR MANUFACTURING CHOCOLATE.
(Application filed Nov. 20, 1900.)

(No Model.) 3 Sheets—Sheet 2.

WITNESSES:
George B. Gribel
Joseph H. Niles.

INVENTOR
Ernest Paul Frederic Magniez
BY
ATTORNEYS

No. 680,489.  
Patented Aug. 13, 1901.  
E. P. F. MAGNIEZ.  
MACHINE FOR MANUFACTURING CHOCOLATE.  
(Application filed Nov. 20, 1900.)  
(No Model.)  
3 Sheets—Sheet 3.
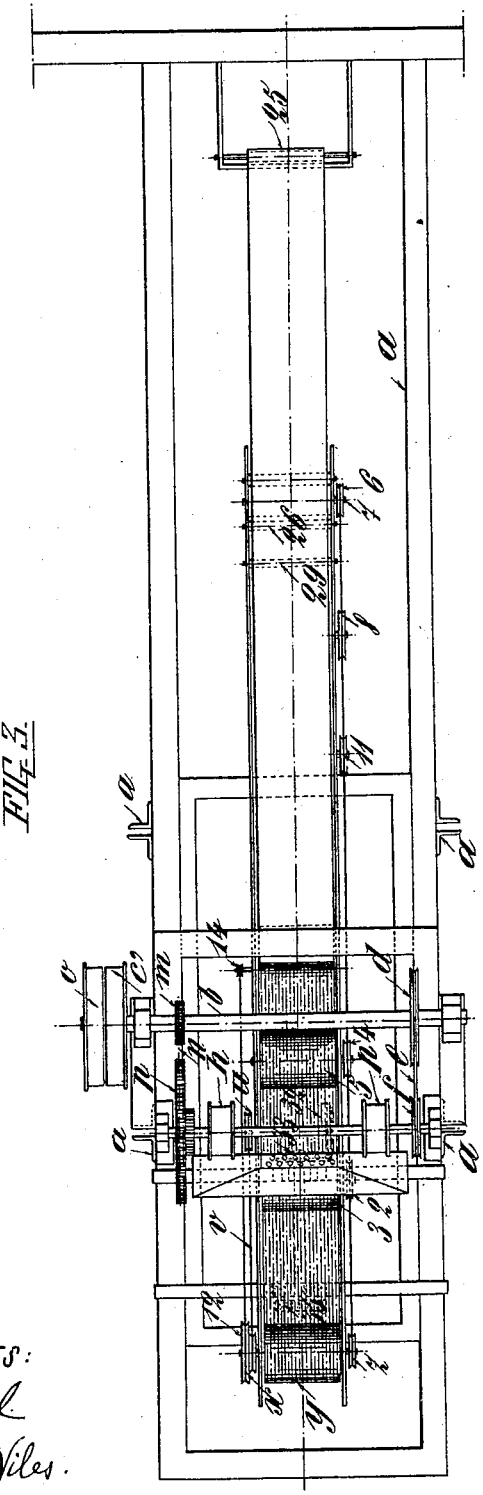
WITNESSES:  
INVENTOR  
Ernest Paul Frédéric Magniez  
BY  
ATTORNEYS.

UNITED STATES PATENT OFFICE.

ERNEST PAUL FRÉDÉRIC MAGNIEZ, OF AMIENS, FRANCE.

MACHINE FOR MANUFACTURING CHOCOLATE.

SPECIFICATION forming part of Letters Patent No. 680,489, dated August 13, 1901.

Application filed November 20, 1900. Serial No. 37,164. (No model.)

*To all whom it may concern:*

Be it known that I, ERNEST PAUL FRÉDÉRIC MAGNIEZ, a citizen of the Republic of France, and a resident of Amiens, France, have invented certain new and useful Improvements in Machines for Manufacturing Chocolate or Like Sweetmeats, which improvements are fully set forth in the following specification.

In the case where the manufacture of chocolate sweetmeats has been performed by hand the operator at the side of a marble table heated at the center draws the pasty dough or mass across the table, so as to acquire the proper temperature. The substance intended to constitute the kernel of the sweetmeat— such as, for instance, sugar or burned almond—is now covered with a coating all around of chocolate, the sweetmeat being at the same time given the desired form. When made mechanically, the apparatus employed consists, mainly, of grates formed with cells or cavities, in which is placed the material intended to form the kernels of the sweetmeats. Each of these grates, which receives any desired number of kernels, is furnished with means whereby it may be immersed either by hand or mechanically into a trough filled with chocolate maintained at the required temperature to possess the necessary fluidity. After immersion the grate is withdrawn and shaken, so as to cause the excess of chocolate on each sweetmeat to fall back into the trough.

Now the object of this invention is to provide an improved device whereby the whole of the operations for completely forming the sweetmeat may be mechanically effected.

With this object in view the invention consists of certain features of construction and combinations of parts to be hereinafter described in detail and then claimed.

In order that my said invention may be readily understood and carried into effect, I will now proceed to described the same fully, for which purpose reference is to be had to the accompanying drawings, in which—

Figure 1:
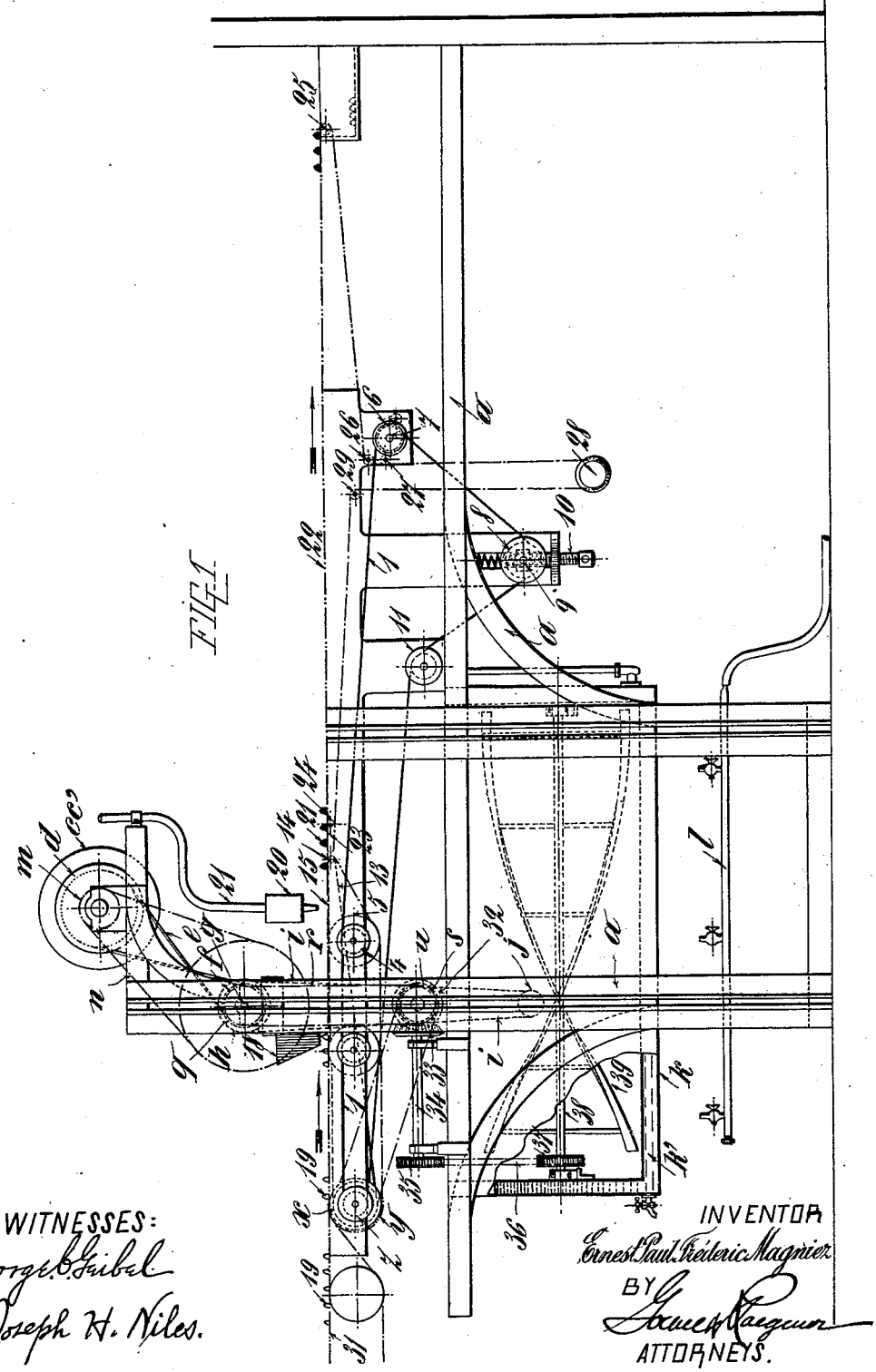
Figure 2:
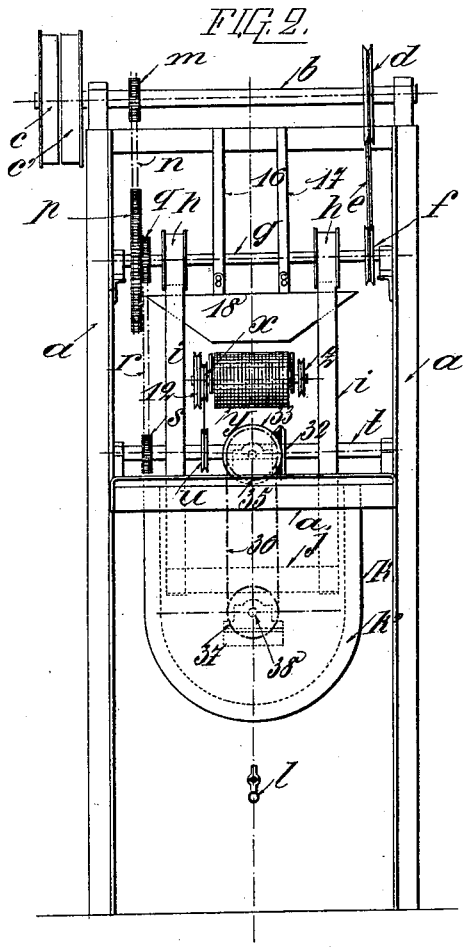
Figure 4:
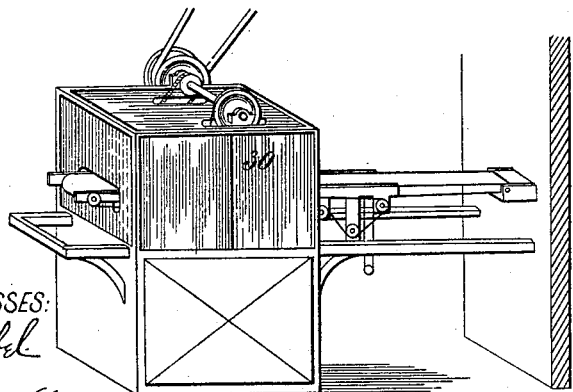

Figure 1 is a side elevation of an improved sweetmeat-machine embodying my invention; Fig. 2, an end view of the same, and Fig. 3 a plan. Fig. 4 is a perspective view showing the machine placed in a casing adapted to completely surround it, so as to enable the temperature in the interior to be properly regulated.

Referring to the drawings, $a$ represents a frame of appropriate form adapted to support the entire mechanism. At the upper portion of this frame is mounted in suitable brackets a driving-shaft $b$, provided with fast and loose pulleys $c$ $c'$ for transmitting the motion received from any suitable source. Upon said shaft $b$ is also keyed a pulley $d$, connected by means of a crossed belt $e$ with a pulley $f$, fast upon a shaft $g$, disposed parallel to the shaft $b$. Upon the shaft $g$ are mounted two drums $h\ h$, each of which is provided with an endless belt $i$, carrying at their lower portion a roller or free spindle $j$, adapted to impart the necessary tension to said belts. The belts $i$ are adapted to dip into a trough $k$, containing the chocolate maintained in a fluid condition by means of a convenient heating apparatus—such as, for example, a gas-tube $l$, provided with jets, or in other suitable manner.

Upon the driving-shaft $b$ is keyed a pinion $m$, over which a link or other suitable chain $n$ is adapted to pass, so driving a loose chain-wheel $p$ on the shaft $g$. With the said wheel $p$ is cast in one piece or otherwise fixed thereto a pinion $q$, operating by means of an endless chain $r$ a pinion $s$, keyed to the shaft $t$, arranged parallel with but at a lower level to the shafts $g$ and $b$. This shaft $t$ carries a pulley $u$, which by means of a belt or rope $v$ operates a pulley $x$, keyed to the shaft of a roller or drum $y$.

Upon the shaft of the drum $y$ is keyed a pulley or wheel $z$, fitted with an endless belt or chain 1. This chain or belt 1 passes over the wheel 2, keyed upon the shaft of a drum 3, over a wheel 4, keyed upon the shaft of a drum 5, and thence over a wheel 6, fast on a shaft 7, whence it is conducted over a tension device consisting of a wheel 8, mounted on a shaft 9, said shaft 9 being capable of being raised or lowered by means of an adjusting-screw 10. The endless chain 1 is conducted over the guide-pulley 11 back to the wheel $z$. Thus the rotation of the wheel $z$ causes a like motion to be imparted to the drums 3 5 and to the wheel 6. The drum $y$ also carries a pulley or wheel 12, adapted to impart motion by means of a belt or chain 13 to a small roller 14.

Over the drums $z$ 3 5 and roller 14 passes an endless band 15 of gauze or suitable material. Said band may, if desired, be constituted by a series of single threads arranged parallel to each other, so as to form an endless conveyer. In order to prevent (when single threads are employed) the distance between such threads being altered, I may groove the drums $z$ 3 5, as well as the roller 14.

To the top bar of the frame are fixed bars 16 and 17, carrying a trough 18, against one side of which latter the two endless belts $i$ rub The movement imparted to said endless belts $i$ causes them to be charged with chocolate by dipping into the trough $k$, and the chocolate adhering to these belts is deposited in the trough 18, owing to the belts being caused to rub against the edge of this latter, as previously stated. From the said trough 18, through perforations in the bottom thereof, the liquid chocolate runs upon the conveyer gauze or threads 15 and thence falls back into the trough $k$. If at the parts marked 19 there are placed upon the conveyer 15 the kernels of sugar or burned almond and of appropriate form, they will be caused to pass beneath the jets of chocolate falling from the trough 18. In this manner they become covered with a coating of liquid chocolate, and after they have traveled past the jets the drum 5 removes the excess of chocolate from the lower end, or, as expressed in workshop terms, "taking the grease off below." At the same time the coated kernels may at their upper portion be subjected to the action of air-jets from nozzles 20, supplied with compressed air through a pipe 21 from any suitable source of supply. The kernels thus coated with only a thin covering of chocolate arrive above the small roller 14, which latter completes the preliminary action of the drum 5. From here the sweetmeats are delivered at 22 upon an endless roll of paper having a translatory motion and the same speed as the threads 15, although, when desired, the speed thereof may be either greater or less than that of the said threads. This endless paper apron 22, as will be seen in Fig. 1, passes around a hinged regulating-block 23, pivoted at 24, and by this means may be regulated exactly to correspond with the height of the roller 14. From the block 23 the paper-apron 22 passes around a board (not shown in the drawings) of any convenient length. At the rear end of this board the paper passes over a roller 25 and thence onto the driving-roller 7, against which latter it is strongly pressed by the action of two small rollers 26 and 27. From here the paper band forms a loop, weighted by a roller 28, and thence passes upward over a roller 29, and finally returns to the block 23. It has previously been explained that the chain 1 imparts rotary motion to the wheel 6 and shaft 7, and owing to the action of the drum on the said shaft 7, against which the paper band is pressed, the latter receives a continuous translatory motion in the direction indicated by the arrow, Fig. 1. The sweetmeats thus manufactured pass without the slightest shaking by the gauze or threads 15 onto the endless paper band 22, and as they travel along with the latter they gradually cool and acquire the necessary hardness to enable them to be at once packed in boxes placed to the rear of the paper band 22—that is to say, at the point where the band passes around the guide-roller 25.

It will be obvious that the distance which separates the block 23 from the roller 25 should be sufficient to enable the sweetmeats to become completely solidified before they arrive at the point 25. If it is desired to impart to the sweetmeats thus produced another form than that of the kernel, the operator can give the required form by hand during their travel from the point 23 to the end 25, and this can, moreover, be done at the most convenient point at which the chocolate coating upon the kernel has acquired sufficient consistency for the operation without, however, being too hard.

As is shown at Fig. 4, the whole of the apparatus is surrounded with a casing 30 in order to completely insulate the trough and the whole part where the chocolate is kept for the purpose of enabling the temperature to be easily regulated. Under these conditions it would perhaps be difficult, especially for large productions, to place the kernels for forming the sweetmeats upon the small portion of the conveyer projection from the casing 30. To this end I provide at 31, Fig. 1, at the front end of the machine an endless gauze, forming, so to speak, a "charging-apron." This charging-apron 31 receives the kernels and automatically carries them onto the gauze or threads 15.

As is well known, it is necessary for the satisfactory production of the sweetmeat that the chocolate should be continuously stirred, so as to keep it in proper condition. For this purpose the shaft $t$ carries a miter-wheel 32, gearing with a similar wheel 33, keyed upon the shaft 34. This shaft 34 is fitted with a pinion 35, which by means of a chain 36 transmits motion to a pinion 37, fast on a shaft 38, fitted with a stirring or agitating device 39, situated in the interior of the trough $k$, this latter being preferably jacketed at $k'$, as shown.

I wish it to be well understood that the parts of the machine giving motion are described by way of an example only and that I do not desire to confine myself to the exact form of construction shown and described, but may modify the same in many ways without departing from the spirit of my invention, the characteristic feature of which consists, as already stated, in the production of sweetmeats by their passage across jets of chocolate, so as to coat the kernels therewith, the excess material being subsequently removed both from above and below either by contact with appropriate rollers or by jets of compressed air.

What I claim, and desire to secure by Letters Patent of the United States, is—

1. In apparatus for manufacturing chocolate and like sweetmeats, the combination of suitable guide-rollers, an endless gauze apron trained over said rollers, and means for supplying jets of chocolate or other coating to the kernels on the apron, substantially as set forth.

2. In apparatus for manufacturing chocolate and like sweetmeats, the combination of suitable guide-rollers, an endless gauze apron trained over said rollers, a dripping device above the apron, and means for cooling the sweetmeats, substantially as set forth.

3. In apparatus for manufacturing chocolate and like sweetmeats, the combination of a suitably mounted and guided endless gauze apron, a dripping device above the apron, and a paper band leading from the discharge end of the apron, substantially as set forth.

4. In apparatus for manufacturing chocolate and like sweetmeats, the combination of a suitably mounted and guided gauze apron, a dripping device, a cooling device, both the dripping and the cooling devices being arranged above the said apron, and a paper band leading from the discharge end of the apron, substantially as set forth.

5. In apparatus for manufacturing chocolate and like sweetmeats, the combination of suitably-mounted guide-rollers, an endless gauze apron trained over said rollers, means for supplying jets of chocolate onto the kernels on the apron, a paper band leading from the discharge end of the apron, and means for cooling the sweetmeats, substantially as set forth.

6. In apparatus for manufacturing chocolate and like sweetmeats, the combination of two troughs, and an endless belt hung loosely in the lower trough and adapted to convey coating material to the upper trough, substantially as set forth.

7. In apparatus for manufacturing chocolate and like sweetmeats, the combination of two troughs located one above the other, and an endless belt extending into the lower trough and working against the edge of the upper trough for conveying coating material to the upper trough, substantially as set forth.

In testimony whereof I have signed this specification in the presence of two subscribing witnesses.

ERNEST PAUL FRÉDERIC MAGNIEZ.

Witnesses:
EMILE LEOBRET,
J. ALLISON BOWEN.